United States Patent [19]

Conklin et al.

[11] Patent Number: 4,768,178

[45] Date of Patent: Aug. 30, 1988

[54] HIGH PRECISION RADIO SIGNAL CONTROLLED CONTINUOUSLY UPDATED DIGITAL CLOCK

[75] Inventors: Charles C. Conklin; Stephen O. Jeppson; Ronald W. Mongeon, all of Santa Clara County; David Schachter, San Francisco County; Philip M. Spira; Paul L. Williams, both of Santa Clara County, all of Calif.

[73] Assignee: Precision Standard Time, Inc., Fremont, Calif.

[21] Appl. No.: 17,666

[22] Filed: Feb. 24, 1987

[51] Int. Cl.[4] .......................... G04C 11/02; H04B 1/10

[52] U.S. Cl. ........................................ 368/47; 375/107

[58] Field of Search ........................ 368/46, 47, 49, 51, 368/59; 375/107, 108, 111, 118; 455/170, 181, 182, 51

[56] References Cited

U.S. PATENT DOCUMENTS

| | | | |
|---|---|---|---|
| 4,117,661 | 10/1978 | Bryant, Jr. | 368/47 |
| 4,440,501 | 4/1984 | Schulz | 368/47 |
| 4,525,685 | 6/1985 | Hesselberth et al. | 368/47 X |
| 4,556,988 | 12/1985 | Yoshisato | 455/182 |
| 4,582,434 | 4/1986 | Plangger et al. | 368/47 |

*Primary Examiner*—Vit W. Miska
*Attorney, Agent, or Firm*—Flehr, Hohbach, Test, Albritton & Herbert

[57] ABSTRACT

A method and apparatus for synchronizing a clock to broadcast time-based signals, said time-based signals including encoded timing information, the method comprising the steps of receiving said time-based signals, decoding said time-based signals to derive a plurality of digits from said timing information representing actual clock time, and separately verifying the correctness of each of said digits, said correctness verifying step including the steps of separately comparing each said derived digit with at least one corresponding previously decoded derived digit and verifying said derived digit when it meets a predefined verification test based on the consistency of said derived digit with said at least once corresponding previously decoded derived digit, repeating said comparison and verifying steps as said time-based signals are decoded until each said derived digit has been separately verified, and generating a lockon signal when all of said derived digits have been verified.

23 Claims, 11 Drawing Sheets

MAIN LOOP

LEAP SECOND DETECTION

PICK BEST FREQUENCY

SAMPLE FREQUENCY

DIGIT VERIFICATION

*EVALUATE 100 Hz DATA*

*LOCK ON TO MINUTE MARKER*

HIGH PRECISION RADIO SIGNAL CONTROLLED CONTINUOUSLY UPDATED DIGITAL CLOCK

FIELD OF THE INVENTION

This invention relates generally to a clock whose time output is based on a radio reference signal and more particularly to a clock that is continuously updated by a recevied radio reference timing signal.

BACKGROUND OF THE INVENTION

Many companies have long desired a constantly available time source that is a reliable national standard with which to regulate timing of their own equipment or for viewing. For example, traffic signal manufacturers desire an inexpensive standard means for aligning traffic signals according to time periods of day so that the signals can modify light intervals with the time of day and changing traffic flow. Computer service companies desire a standard basic continuously updated clock in order to coordinate the activities of computers in various locations.

The National Bureau of Standards has been broadcasting time information on standard frequencies for many years from stations in Ft. Collins, Colorado and Kauai, Hawaii. Companies have attempted to market a clock that could receive and decode this signal; however, the signals are relatively weak and therefore are subject to noisy reception. Thus, radio signal receiver clocks that have been known in the prior art may fail to lock on to the signal for long periods of time, or adopt an incorrect timebase. Moreover, many of the applications requiring precise time cannot afford to use an expensive clock.

The primary objective of this invention is to provide an inexpensive, highly accurate clock that is periodically updated by a received, broadcast time reference signal. To understand the invention, it is first necessary to understand some of the details of the clock signal that is broadcast.

The National Bureau of Standards broadcasts continuous signals containing time, date and other information on high frequency radio stations WWV in Ft. Collins, Colorado, and WWVH located in Hawaii. The radio frequencies used are 2.5, 5, 10, 15, and 20 Mhz. All frequencies carry the same program, but because of changes in ionospheric conditions, different frequencies are more easily received at different times of day. The time being broadcast is on the universal time scale also known as Coordinated Universal Time (UTC), formerly Greenwich Mean Time. This time scale is based on atomic clocks with corrections made for the rotational variations of the earth. The specific hour and minute transmitted in the broadcast and mentioned in the audio portion of the broadcast is that corresponding to the time zone centered around Greenwich, England. The UTC time differs from local time only by an integral number of hours in most countries including the United States of America. The UTC time announcements and transmissions are expressed in the 24 hour clock system i.e. the hours are numbered beginning with zero hours at midnight through 12 hours at noon to 23 hours, 59 minutes just before the next midnight.

As noted above, the National Bureau of Standards broadcast uses a carrier at 2.5, 5, 10, 15, and 20 Mhz with a 1000 Hz amplitude modulating tone burst to signal the beginning of each minute on Colorado station WWV, and a corresponding 1200 Hz amplitude modulating tone burst on Hawaii station WWVH. A 100 Hz subcarrier contains binary coded decimal (BCD) signals that supply day of the year, hour and minute information. Complete BCD information in the form of a frame is transmitted each minute. This information is encoded by pulse width modulation of the 100 Hz subcarrier. The data rate is one baud per second, where each symbol is a 0, 1 or position marker. Within a time frame of one minute, enough pulses are transmitted to convey, in BCD, the current minute, hour and day of the year. Two BCD digits are needed to show the hour and the minute (00-23 and 00-59), and three digit groups are needed to show the date (001-366). The BCD time information is updated every minute. The BCD signals also have data providing a correction for periodic variations in the speed of the earth's rotation and information indicating whether daylight savings is in effect.

The most frequently transmitted signals on WWV and WWVH are pulses that mark the seconds of each minute (except the 29th and 59th second pulses of each minute, which are omitted completely), referred to hereafter as ticks. The first pulse of each hour is an 800 ms pulse of 1500 Hz. The first pulse of each minute is an 800 ms pulse of 1000 Hz (WWV) or 1200 Hz (WWVH). The remaining second pulses, or ticks, are brief audio bursts (5 ms pulses of 1000 Hz or 1200 Hz) that resemble the ticking of a clock. All pulses are commenced at the beginning of each second, and are given by means of double side band amplitude modulation. Each seconds pulse (or tick) is preceded by 10 ms of silence and followed by 25 ms of silence to avoid interference.

A more complete description of the signal format may be found in the National Bureau of Standards special publication 432, incorporated herein by reference. In this disclosure, reference is frequently made to Station WWV; however, this clock also receives Station WWVH, automatically selecting the first available signal of acceptable quality. Reference is also made to 1000 Hz, the WWV broadcast frequency; this clock also receives and samples the 1200 Hz signal of WWVH.

Because the earth's speed of rotation may vary, the use of leap seconds is occasionally necessary, perhaps once a year, to keep the broadcast time signals (UTC) within ±0.9 seconds of the earth related time scale. The addition or deletion of exactly one second occurs at the end of the month. The system herein has the capability of detecting leap seconds; therefore, a brief summary of the meaning of leap seconds is disclosed herein. When a positive leap second is required, an additional second is inserted beginning at 23 h 59 m 60 s of the last day of the month and ending at 0 h 0 m 0 s of the first day of the following month. In this case, the last minute of the month in which there is a leap second contains 61 seconds. Assuming unexpected large changes do not occur in the earth's rotation rate, it is likely that positive leap seconds will continue to be needed about once a year. If the earth should speed up, a negative leap second is deleted. In this case, the last minute of the month would have 59 seconds.

Prior efforts have been made to provide a clock signal receiver that receives the radio broadcast signals described above, such as the system disclosed in U.S. Pat. No. 4,582,434. However, the system in that patent is subject to locking onto a noise-heavy signal rather than the desired signal; this is a major fault because the NBS signal transmissions are subject to serious noise problems. Further, the '434 patent lacks a sufficiently reliable method of verifying accurate data reception.

SUMMARY OF THE INVENTION

An objective of this invention is to provide an improved radio signal controlled clock.

More particularly, it is an objective of this invention to provide for accurate long term operation of a clock by periodic updating of the clock by a received radio reference time signal.

It is another objective of this invention to provide for automatic tuning of the radio receiver in a radio signal controlled clock to the frequency of transmission that provides the highest probability of accurate decoding of the information, rather than simply the strongest one of the multiple frequencies on which information is being transmitted.

A further objective herein is to provide a highly accurate radio controlled clock capable of receiving standard time broadcasts throughout North America, Hawaii and the Pacific Basin, switching between the signals broadcast on stations WWV and WWVH.

Another objective of this invention is to provide a radio controlled clock capable of automatically switching between 1000 Hz (WWV) and 1200 Hz (WWVH) so that the most reliable signal is being decoded.

Another objective is to provide an internal digital crystal trimming system, whereby the internal microprocessor is calibrated to the WWV signal while good signal is being received, thereby allowing the microprocessor to keep time accurately during intervals between good WWV signal reception.

Due to noise, fading, multipath and the like, a received bit cannot always be reliably decoded, and bit errors will occasionally occur. It is an objective herein to minimize the possibility of unreliable decoding.

A stringent data verification algorithm decreases the probability of decoding a bit in error, but also decreases the probability of decoding it at all. Therefore, an objective herein is to reduce the probability of decoding errors to an acceptable minimum, while successfully deducing the correct time within a reasonable period. This is achieved by verification at the electrical, syntactical and semantic levels.

It is a further objective to provide software means for correcting inherent hardware signal processing delays so as to minimize the error between the clock's internal time and the received time.

It is a further objective of this invention to maximize the accuracy of data reception by using digital reception and analysis of the 100, 1000, 1200 and 1500 Hz signals.

It is a further objective of this invention to provide, in addition to the automatic switching between Hawaii and Colorado transmitting stations, a fine adjustment for the propagation delay based on automatic detection of which signal is being received, and modification of the detected time based on the known propagation delay.

A further objective is to maximize the accuracy of analysis of the received data by using semantic data analysis and consistency checking to provide multiple verification of the signal received, and to continue to verify, over a period of time, that accurate data is being received, displayed and output by the system.

In summary, this invention achieves the above and other objectives by providing method and apparatus for decoding timebase signals which incorporate timing information. Timing, or calendar information, as used herein, means the present millisecond, second, minute, hour, day, month, year and Julian date, as well as whether or not daylight saving time is in effect, all based on UTC. The apparatus includes a receiver for receiving time based signals broadcast from either of two broadcast sites and for automatically selecting the stronger channel. The signal is broadcast on five different frequencies, and the receiver includes a frequency selection algorithm for selecting and locking the receiver onto a frequency carrying information likely to be successfully decoded, rather than simply picking the strongest signal. As part of this invention, the receiver apparatus includes the first use of an active filter controlled by the microprocessor to be tuned to the modulation frequency on which data to be detected is carried.

As part of the method of detecting calendar information, it is recognized that the selected frequency carries the time and date information at 100 Hz, and the seconds ticks and minute markers at 1000 Hz or 1200 Hz. Therefore, a minute marker is first detected, and the internally maintained time of the system is accurately synchronized by ongoing estimation of tick arrival times. In order to maintain the usefulness of this clock receiver for highly accurate time synchronized applications, the system checks the alignment of the internal microprocessor with ticks during each minute in order to verify that the synchronous state of the system has been maintained, and that a strong data signal is still being received. Thereafter, on a timely basis, digits are received and verified using a unique digit verification algorithm. In general, this verification algorithm keeps a score for each received digit; each digit has to score a minimum number of points in order to be considered verified.

To avoid loss of an accurate clock output, two timebases are maintained by the system; a guess timebase which is the current best guess as to the time being transmitted on the channel being received, and the display timebase which is the time displayed or available via the RS-232 port. The system includes means for verifying the guess time (using a time history buffer that receives each time digit) and for copying the guess time onto the display output driver interface.

This driver interface also sends to the display a marker indicating the presence or absence of decodable 100 Hz signal in the previous second; the display is also responsive to the microprocessor output so that it blinks until all digits and the presence or absence of daylight savings is verified internally, after which it is steady and continuous.

Other advantages and features of this invention will become apparent from the following detailed description given with reference to the following figures.

DESCRIPTION OF A PREFERRED EMBODIMENT

Figure 1:
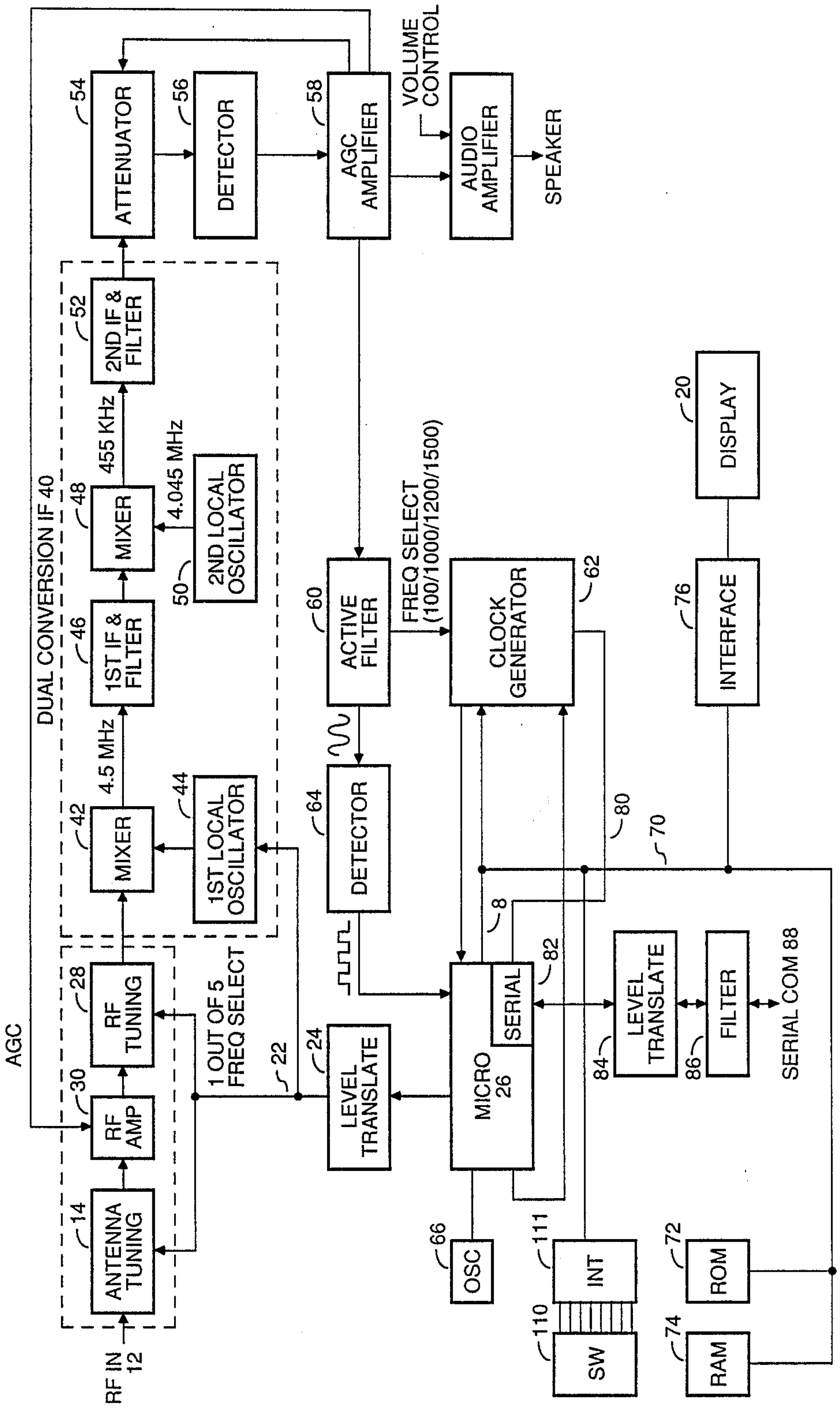
FIg. 1 is a block diagram of the continuously updated clock receiver of this invention.

Referring to FIG. 1, there is shown in simplified block and schematic form a radio signal controlled clock constructed in accordance with this invention. The RF signal 12 provided to the tuning block 14 includes a time code that is decoded by the system to provide on the RS-232 port and display on the display 20 the hours, minutes, seconds. In addition, the date is available on the RS-232 port.

The tuning system 14 comprises five coils with capacitors and switching diodes responsive to the signals on control line 22 received via level translator 24 from microprocessor 26. The microprocessor 26, following a frequency selection algorithm discussed in detail with reference to FIG. 4, selects one of the five frequencies listed above for reception. The same control lines 22 run to the RF tuning block 28 in order to provide sharper RF tuning in the amplifier. An RF amplifier 30 is also provided between the two tuning blocks to amplify the signal being received by the antenna.

The output of the RF tuning stage 28 is passed to a dual conversion IF strip 40 of a standard design including a mixer 42 where the received signal is mixed with the output of a local oscillator 44 whose output is either 4.5 Mhz above or below the RF signal. The resulting 4.5 Mhz signal is passed through an IF and filter chip 46 to a second mixer stage 48 where the signal is mixed with the output of a second local oscillator 50 having an output signal at 4.05 Mhz. The second IF and filter chip 52 receives the resulting 455 Khz signal from mixer 48 and passes it to an attenuator 54.

In a significant departure from prior designs, the output of the dual conversion IF 40 is passed to an attenuator chip 54 rather than directly to an AGC amplifier. The result of the use of this attenuator 54 is a significant reduction in audio distortion of the signal to be processed. The output of attenuator 54 goes to the detector 56 which is a full wave rectifier. The output of the detector goes to an AGC amplifier 58; this output includes the audio envelope. DC elements of the output of the detector are used to define two AGC signals, one to the attenuator 54, another to the RF amplifier 30. The output of the AGC amplifier, i.e., the peak-to-peak audio signal in the range of 0-2 Khz, is applied to a switched capacitive filter such as the National MF8 filter 60. A controlling input to filter 60 comes from the output of a clock generator 62 which is in turn controlled by a microprocessor 26. This active filter 60, a critical element in the design herein, is used in the audio band to selectively interrogate the audio frequencies transmitted on WWV/WWVH. The frequencies are selected in a manner controlled by the software discussed below by microprocessor 26, and controlled through clock generator 62, the clock rate determining the selected frequency to be passed by the active filter 60.

The output of the active filter 60 is coupled to a threshold detector 64 (with hysteresis to prevent jitter) that detects the edges of the signal (provided they achieve a minimum amplitude). The detector 64 forms a square wave signal that can be operated on by the microprocessor 26 to detect the existence of the frequency selected by the filter. The microprocessor has a real time input from the crystal oscillator 66, running at a relatively high frequency relative to the detected audio signal, and can be used to detect the leading and trailing edges of the data signal.

The oscillator 66 operates at a rate of 6.144 MHz. The microprocessor divides this rate by 4 to 1.536 MHz and feeds this latter signal to the clock generator 62. The clock generator 62 has three programmable dividers, one of which normally divides the latter rate by 1536, resulting in a 1 KHz interrupt for the microprocessor 26. This interrupt is the internal timing source, or heartbeat, of the clock. Since the crystal of the internal oscillator 66 may drift slightly from 6.144 MHz it may be necessary to adjust the heartbeat in order to keep the internal timebase synchronized to WWV time by making up at the beginning of a minute the difference measured in the previous minute. To do this, the divisor applied in clock generator 62 is modified to be 1535 or 1537 for a short initial portion of each minute, if required.

In addition, while signal is not being received, the heartbeat allows the internal timebase to be maintained. During such time, the programmable divider determining the heartbeat is modified each minute by an amount estimated by an algorithm below.

A second output of the programmable divider is fed to the microprocessor 26 as a baud rate generator for the serial output 82; and the third divider output is fed to the active filter 60 as alluded to above.

The timing data derived from the signal received is sent out from the microprocessor over a data and address bus 70 which is also used to access the instructions stored in the ROM 72 and the data stored in the RAM 74. The digits that appear on the data bus 70 are coupled, one digit at a time, through the interface 76 to the display 20. Through the port 82 signals can be sent and received through a level translator 84 and filter 86 over a serial communications port 88.

Control of the active filter 60 to switch between the 100 Hz, 1000 Hz, 1200 Hz and 1500 Hz frequencies in response to signals from clock generator 62 is essential to accurate time detection.

The start of each minute (except at the beginning of the hour) is conveyed by a 1000 (resp 1200) Hz signal on WWV (resp WWVB). Seconds boundaries are also indicated by a 1000 (resp 1200) tone of shorter duration. The minute, hour and day of year are conveyed by 100 Hz tones which do not overlap with the other tones. Thus the filter 60 can be switched at appropriate times to receive all of these tones.

MAIN CONTROL LOOP (FIGS. 2A-2F)

Next to be considered is the software which conducts the data analysis functions on which this invention depends. The invention includes a number of subroutines that perform functions not previously provided in a radio receiver controlled real time clock; these are all called from the main loop. Therefore, the main loop program of the microprocessor will first be reviewed with respect to FIGS. 2A-2F.

Figures 2A, 2H:
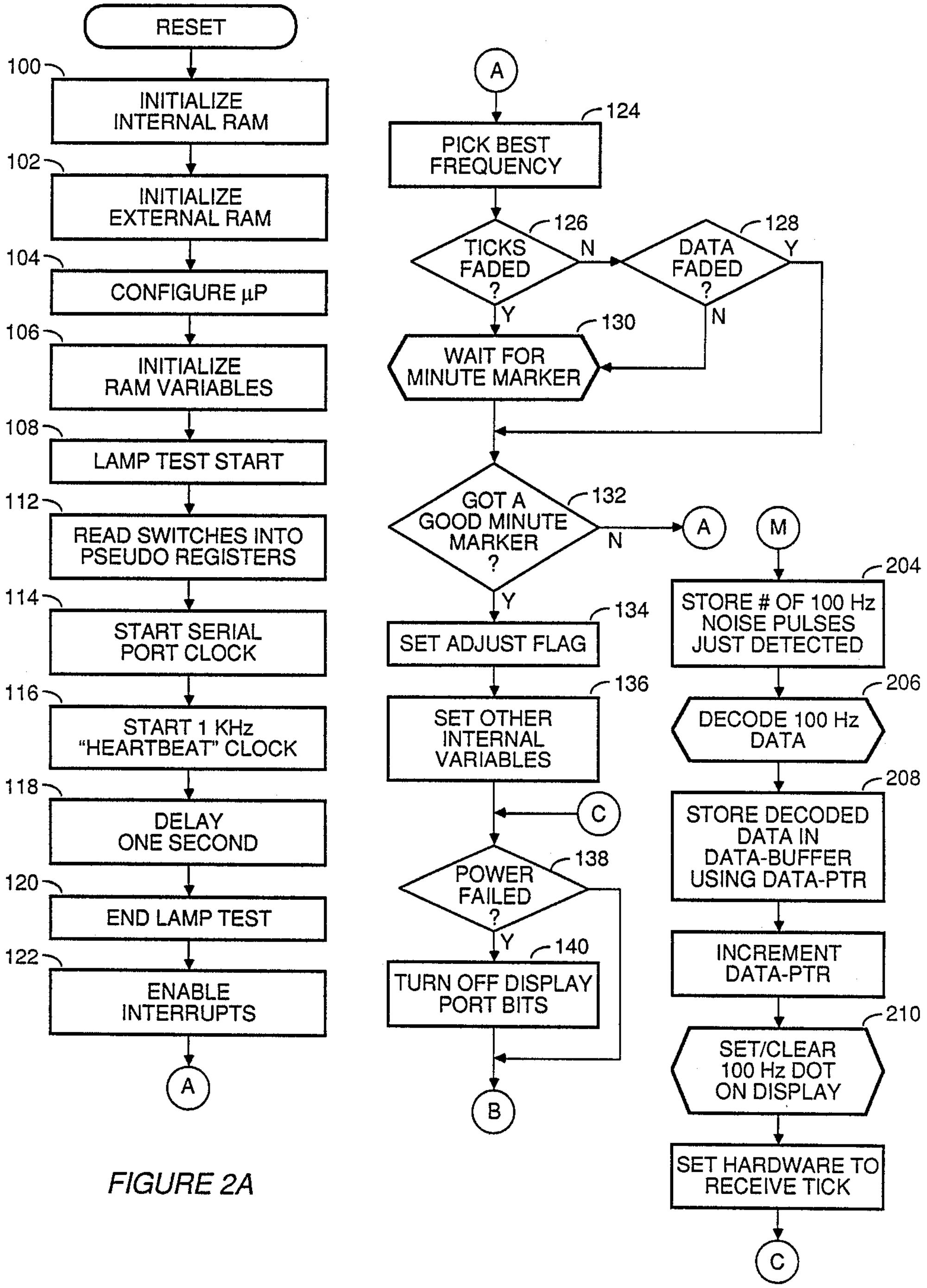
FIGS. 2A–2H show the flow chart of the main loop through which the controlling microprocessor of this invention continuously cycles.
Figure 2B:
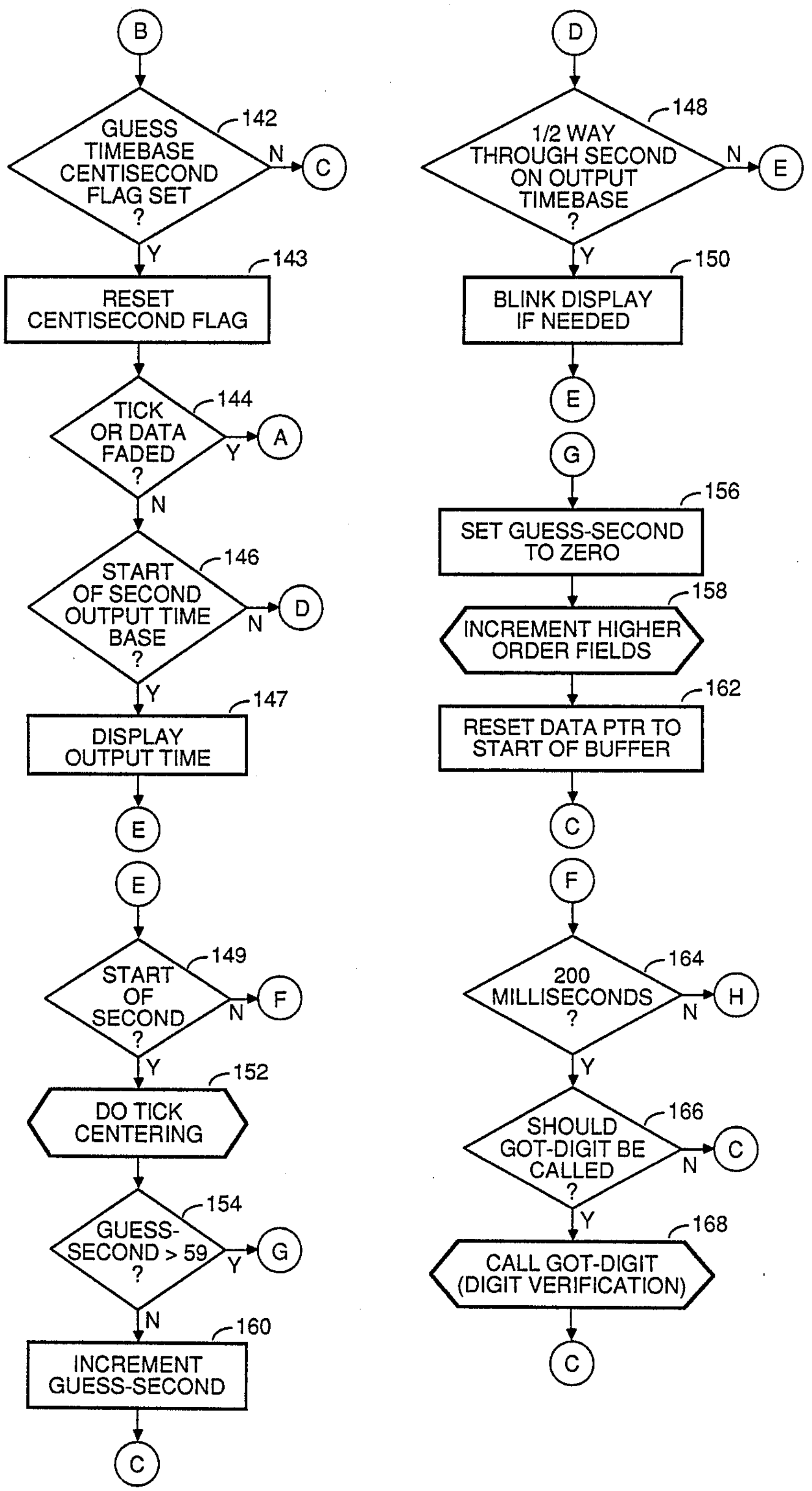

FIG. 2A shows the initialization flow chart in which the RAMs are initialized at steps 100 and 102, the microprocessor is configured according to a known setup routine at 104, the RAM variables are initialized at step 106 and display test starts at step 108. Switches 110 are read through an interface 111 (FIG. 1) into registers 112, the serial port clock is started 114, and the internal heartbeat clock, defined by the clock generator 62, is started at step 116. A one second delay 118 ensues to allow the observer to see that the LEDs are functional, after which the display test is ended 120. The interrupts to begin reading the received data signal are enabled 122, as well as the serial port interrupt and power fail interrupt.

Figure 5:
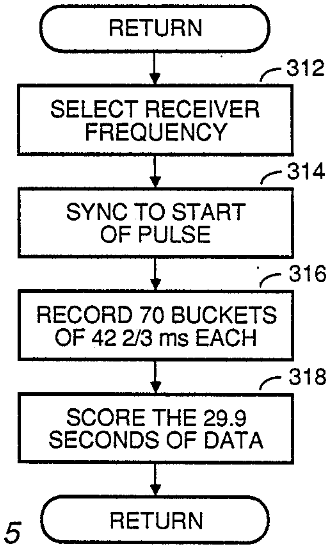
FIG. 5 is a flow chart of the steps used to sample frequencies for adequacy of reception.
Figure 6:
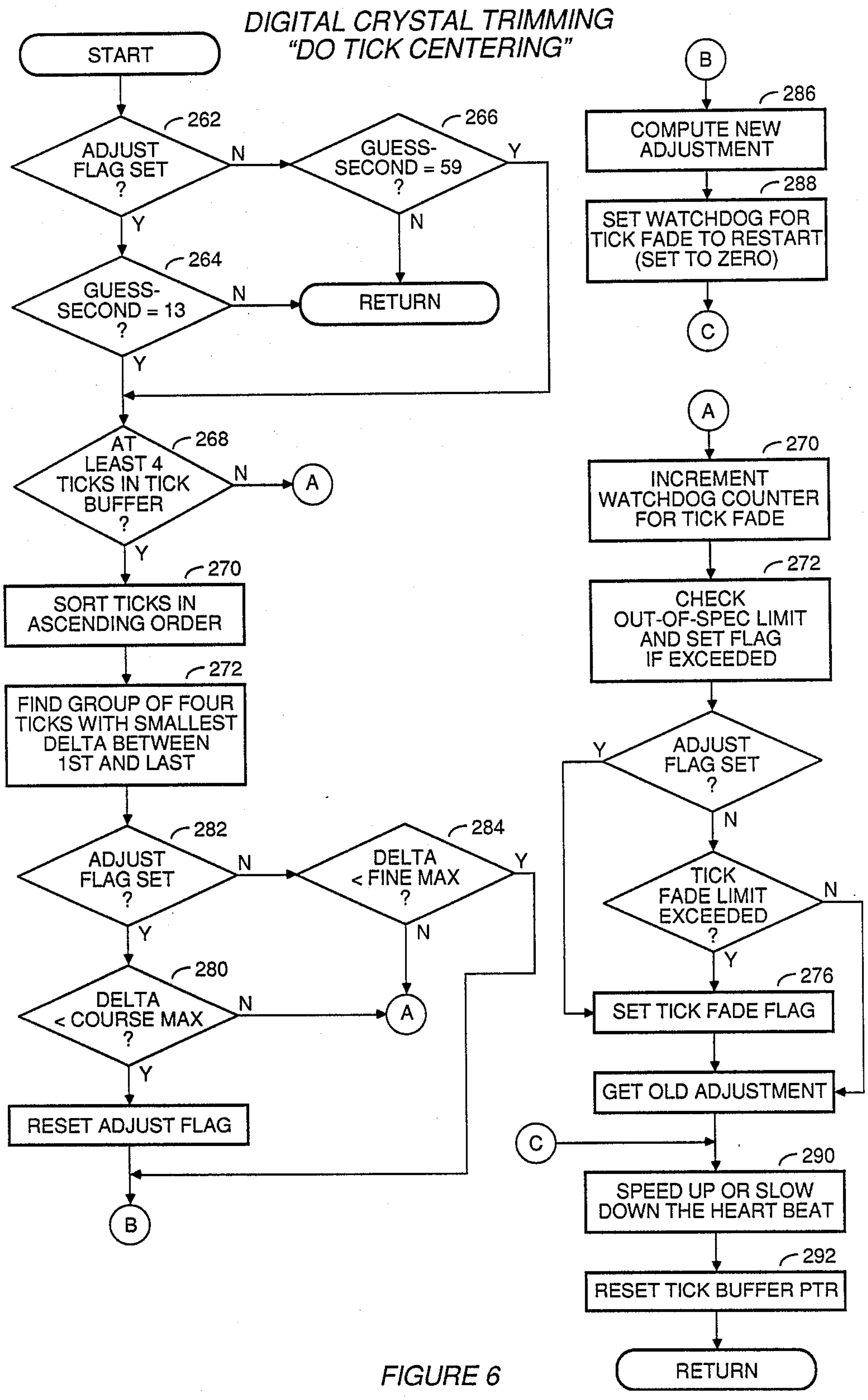
FIG. 6 is a flow chart of the steps involved in digital crystal trimming used to synchronize the internal oscillator with tick seconds received in the radio signal.

After initialization, general operation of the system can be described as follows: when the clock is powered on or has lost signal for some time, it successively tries the five available frequencies as discussed with respect to FIG. 4 until it has found one with a sufficiently decodable 100 Hz signal using the algorithm in FIG. 5. Having selected a frequency, the clock looks for a minute marker. When the minute marker occurs, the clock starts counting and displaying seconds. It then looks for ticks in order to verify that tick adjustment can occur. If so, it starts decoding 100 Hz data on the chosen frequency. Otherwise, a new frequency is selected and the process of finding a minute marker and so on is restarted. Means are provided working with the internal timing or heartbeat of the microprocessor clock to frequently trim that timing to agree with the received WWV signal as discussed with respect to FIG. 6. After the initial coarse centering of the internal time to the one-second pulses occurs, a more accurate fine tick centering occurs. This algorithm also calibrates the microprocessor clock to WWV. When signal is lost, the displayed time is based on the derived timing, i.e., the internal heartbeat until the radio signal is recovered.

The data for the minute, hour, day of year and daylight savings is encoded on the 100 Hz subcarrier. Each bit repeats at a known time once per minute. The data is pulse width modulated as 100 Hz subcarrier modulation of the frequency received. The software is continually decoding all this data and recording it into a history buffer; constant semantic checking is performed on the contents of this buffer using the sequence discussed with respect to FIG. 7. Only when there is an exceedingly high probability of the derived time being correct will the clock commit to the internal time, and display it as verified output time data on display 20 and output it via the serial port.

The 100 Hz subcarrier also includes markers that occur every 10 seconds. The software uses them as an additional validity check and to detect leap seconds as in FIG. 3. Whenever 100 Hz data or one second ticks are not being received with sufficient reliability (FIG. 9) to be assured of accurate time, means are provided (FIG. 4) to again select a new frequency. The interrupt sequence of the system is discussed with respect to FIG. 8. These flow charts will be discussed in greater detail below. To the extent specific steps appearing in the flow chart are not mentioned or only mentioned in passing, they are believed to be steps readily apparent to a skilled programmer working in this technology.

In reviewing the following flow charts, note that the system maintains two separate timebases, an internal, or "guess" timebase and an output timebase, both of which contain the daylight savings bit, Julian date, hour, minute, second and millisecond past the minute.

Figure 8:
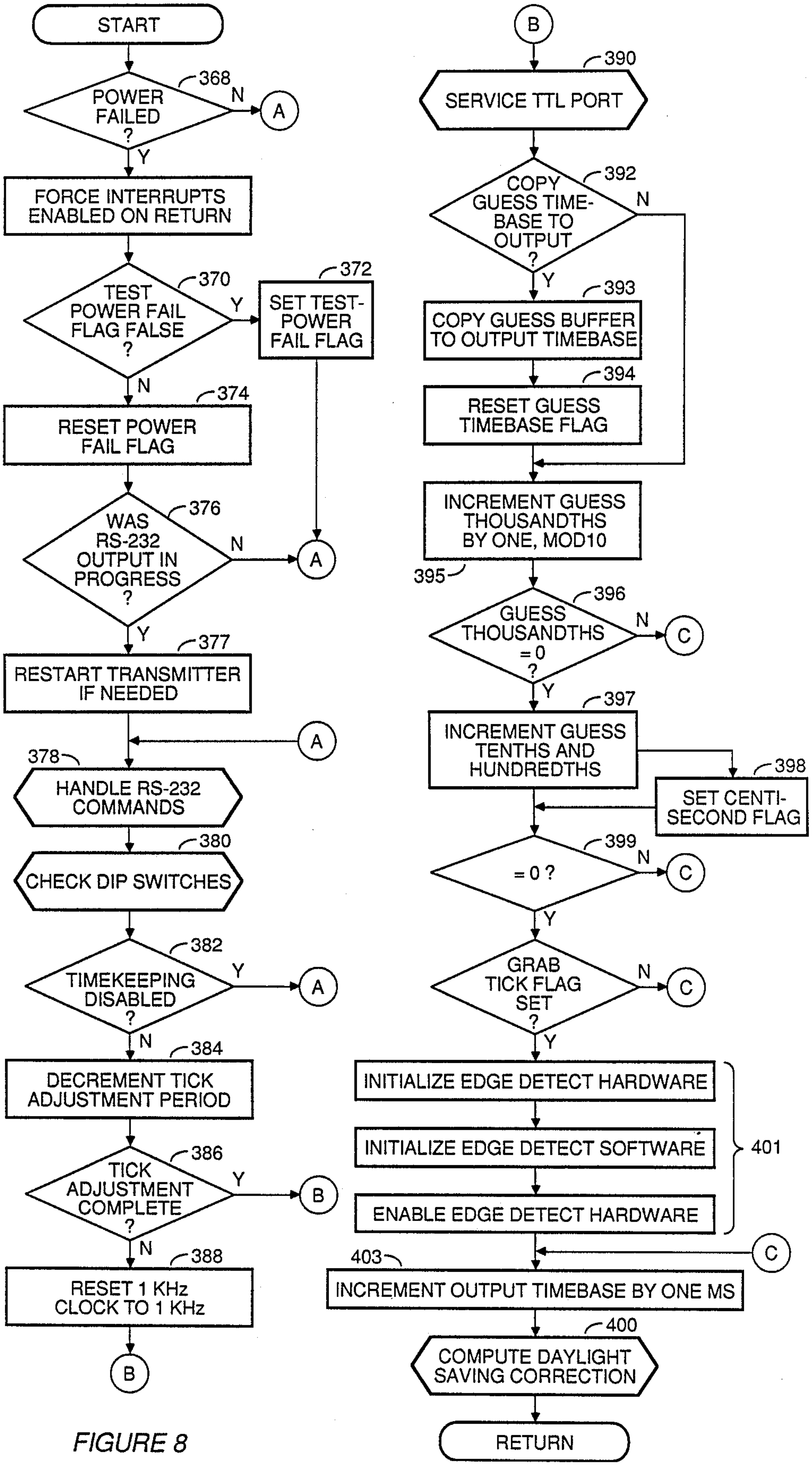
FIG. 8 is a flow chart of the heartbeat interrupt sequence used to keep internal time and trigger the execution of major portions of the software.

The millisecond is the first data item stored in the internal timebase. It is initialized when the first minute marker is received. Each bit or digit of the internal timebase is the most recently received and successfully decoded instance of that bit or digit, incremented to reflect the time that has lapsed since its receipt if the lower order digits (less significant) are present. This timebase is actually incremented 1 ms whenever a heartbeat interrupt occurs (FIG. 8). The internal timebase is what is displayed prior to lockon, during which time the display blinks once per second.

The output timebase is displayed 146 and available on the RS-232 port after lockon has occurred. As data items are received, their value is copied to a history buffer, as well as to the internal timebase. Lockon occurs the first time the contents of the history buffer pass a consistency check on all data items against the guess time base known as digit verifiction 168. This check occurs after a complete digit or the daylight savings bit is successfully decoded and certain other conditions are met, as described below. Whenever digit verification is successful, the guess timebase is copied to the output timebase.

Figure 4:
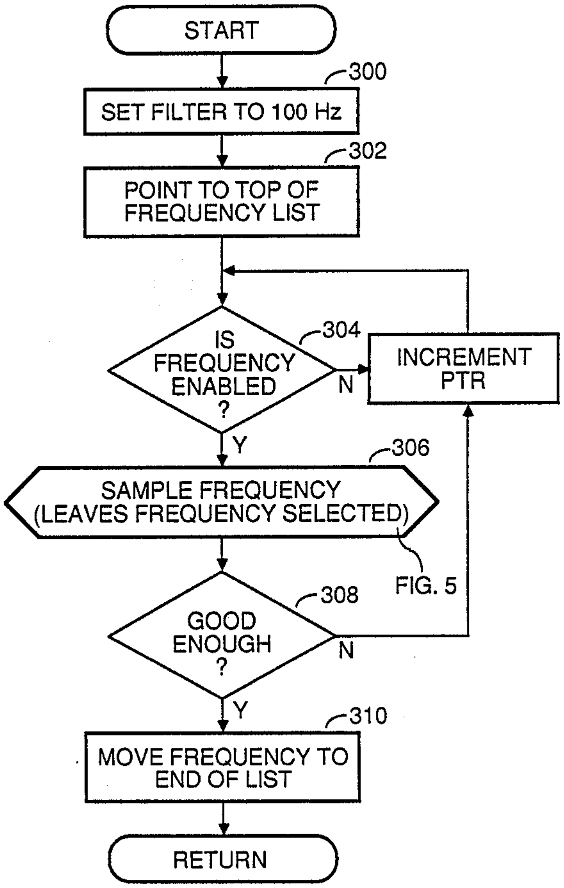
FIG. 4 is a flow chart of the steps encompassed in selection of the best frequency.

Continuing with the main loop shown in FIGS. 2A-2F, once the initialization sequence in box 100-122 is completed, the main loop then proceeds to the pick best frequency routine which is shown in detail in FIG. 4. A frequency having been selected, it then looks to see if ticks have faded 126; receipt of ticks keeps the internal microprocessor timing aligned with the externally received broadcast signal. If ticks have not faded, it next checks to see if the 100 Hz data has faded 128. More particularly, the tick centering subroutine of FIG. 6 sets and resets the flag checked at box 126; the received 100 Hz data subroutine of FIG. 9 sets and resets the flag checked at box 128. Note that on initialization, both flags are "false."

Under appropriate flag settings, the next step is to look for a minute marker 130, the long tone that indicates the start of each minute. Block 132 is a check for a good minute marker that waits 70 seconds and proceeds with the program only if a good marker has been received in that time interval. If a good minute marker is not received, the routine picks another frequency and waits again for the minute marker (since the tick and data fade flags are false on initialization and remain false until good ticks and good data are received respectively). Eventually a good minute marker is received. After that event, the only way to pick a frequency again is if tick or data fade 144, and the only way to wait again for a minute marker is if ticks have faded, as is appropriate.

Block 134 sets the adjust flag that determines whether tick centering is to be performed based on data received at the beginning or at the end of the minute. The state of the adjust flag determines whether tick centering is carried out based upon the first 12 (coarse) seconds or last 12 (fine) seconds (i.e., seconds 47-58) of the minute. The former occurs when the adjust flag is set, i.e., immediately after the minute marker is detected. If this adjustment is successful, the clock will begin to decode data on this frequency. Every minute thereafter, fine tick centering is performed by looking at the arrival time of the last ticks of a minute, i.e., those indicating seconds 47 through 58 of the minute, since no tick is broadcast at the 59th second.

Blocks 136, 138, 140 attend to housekeeping details of checking flags, variables, and seeing that the system is properly powered. Except for checking for power fail 138, main loop processing occurs when the internal time-base indicates that it is an integral multiple of 10 ms past a second (i.e., an integral centisecond) 147. At such time it again checks for tick or data fading at block 144. It should be noted that the system will only return to pick a new frequency when it finds that ticks or data have faded. At block 146 the system checks to see if it is at the start of a second; if not, it checks to see if it is halfway through a second at block 148, and if so, it blinks the display if the data has not yet been verified (as occurs in the digit verification algorithm), i.e., prior to lock on.

If it is start of a second 146, display time is transferred to the output 147. The block 154 constitutes the steps of incrementing the internal guess timebase including checking to see if guess second thereby would become greater than 59. If so, block 156 sets the guess second to 0, and increments the higher order digit fields to reflect the start of a new minute. The flow chart starting with the letter "F" is entered if the current time is not the start of a second as determined at block 149. Blocks 150, 148, 164, 170, 178, 180, 182 and 184 constitute a simple scheduler, causing certain processing to occur at certain internal timebase times within each second. Thus, for example, this flow chart proceeds to blocks 164, 166 and 168 for execution of the digit verification routine which appears in FIG. 7A and 7B. The time defined at block 164 can be found because it is known that a tick occurs every second; the heartbeat interrupt can divide each second into 1000 parts or interrupts, and by counting interrupts, a 200 millisecond point can be defined.

Figure 2C:
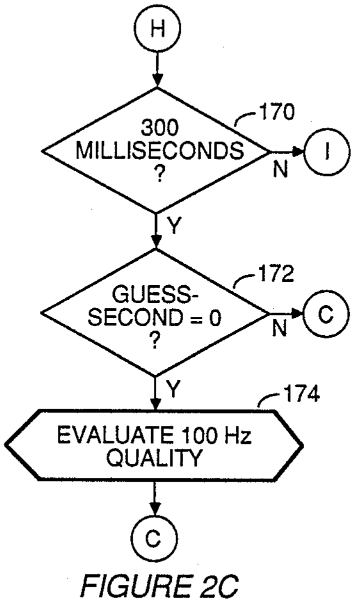
Figure 2D:
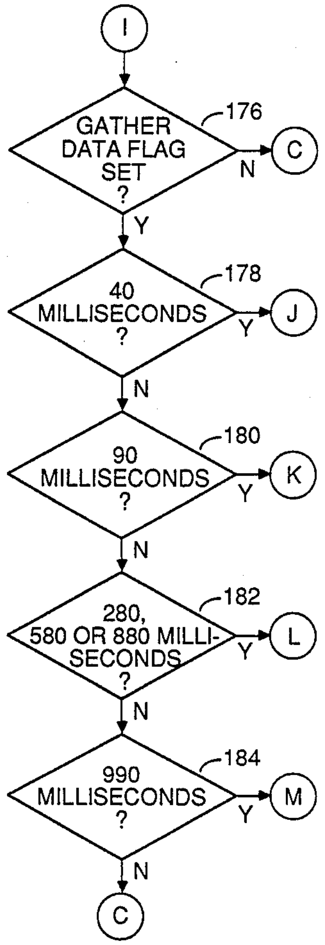
Figure 2E:
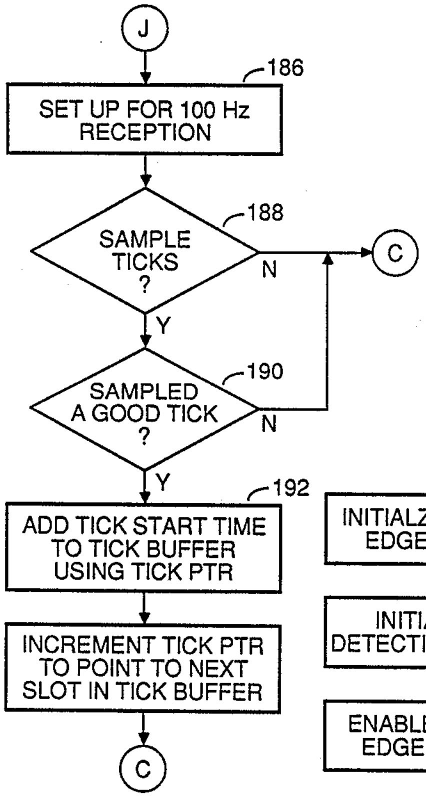

It will be found in the flow charts appearing in FIGS. 2C and 2D that other subroutines are entered at other points defined by the interrupt rate. Thus, for example at 300 ms, blocks 170, 172, 174 are executed. If the guess second timebase is equal to 0, detection of a minute's 100 Hz data has just been completed, and the program will enter the 100 Hz evaluation subroutine to evaluate the quality of the data received during the previous minute. FIG. 2D is essentially a "case statement" illustrating exactly when various subroutines must be entered. After checking to see if it is time to collect the data being transmitted in the 100 Hz field block 176, then at 40 ms, for example, the program starts looking for the 100 Hz signal 178 and then checks to see if it continues to be broadcast at various time periods later.

The length of the 100 Hz transmission defines whether 0, 1 or marker is being transmitted. At the 40 ms mark the routine sees whether a good tick was received and prepares to start receiving 100 Hz data by setting the frequency of the filter 60. At 90 ms (box 180) the program starts counting 100 Hz pulses, since the filter should have rung down from the seconds tick. At block 182 the program checks (at three different times) to detect whether the 100 Hz signal has ended as this defines whether 0, 1, or a marker bit has been transmitted.

The branch from box 178 is to box 186 where the equipment is set up for 100 Hz reception, i.e., the active filter 60 is programmed to pass 100 Hz signal by microprocessor 26 controlling clock generator 62. A flag box 188 is checked to determine whether ticks are to be sampled, and the sampling of a good tick 190 moves the program to read this tick start time into tick buffer box 192 to provide the necessary information to be used by the tick centering algorithm of FIG. 6. A good tick will be defined by the software to mean 8–24 cycles of tick energy passing through the filter; and, if the adjust flag is off (meaning a fine adjustment is being made), the tick started within 8 ms of where it is expected to start. The information derived will be used to align the internal heartbeat with the tick seconds within the clock system. As explained above, the adjust flag is true if ticks should be sampled from seconds 1–12 of a minute; if the flag is off, ticks are sampled from seconds 47–58 of a minute.

Figure 2F:
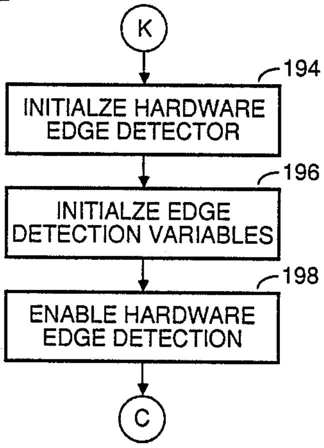

Turning to FIG. 2F, the program is set up at block 186 to receive the 100 Hz signal; at block 194 the hardware edge detector and edge detection variables (block 196) are initialized and hardware edge detection is enabled 198. At the 90 ms point, the software starts looking for the existence of an edge of a 100 Hz signal. Note that the period between 40 and 90 ms allows the 1000/1200 Hz energy in the filter to escape and not appear as spurious 100 Hz.

Figure 2G:
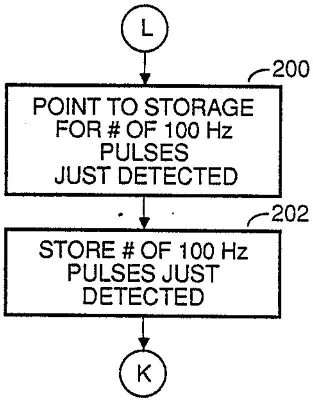

The routine of FIG. 2G stores the number of 100 Hz pulses detected (200, 202) which in turn define whether a 0, 1 or marker bit has been transmitted. At the end of this routine there is a return to the subroutine of FIG. 2F; for if the 100 Hz signal continues, the system determines that in fact noise is being received and the data just received should be eliminated. A continued failure on this linked pair of subroutines in charts 2F and 2G will eventually lead the system to conclude that noise is being received and that the system should select a different frequency. In this way, the analysis of the data for verification is limited to a fixed number of minutes of reception on any single frequency before the frequency is switched, if the signal quality on the frequency becomes poor.

The flow chart of FIG. 2H is entered after detection of the 990 ms point block 184. The routine stores the number of 100 Hz pulses detected 204; it then decodes the data 206, stores the data 208, and sets or clears the 100 Hz dot on the display 210. This dot is set if 100 Hz data was successfully decoded in the previous second. The routine also switches the active filter to receive either 1000 or 2000 Hz, depending upon the frequency of the most recently received minute marker.

The following are major subroutines that must be executed in order to verify that a valid signal has been received and continues to be received, that data has been decoded, and to synchronize the guess time with the displayed time as well as for other reasons.

Figure 9:
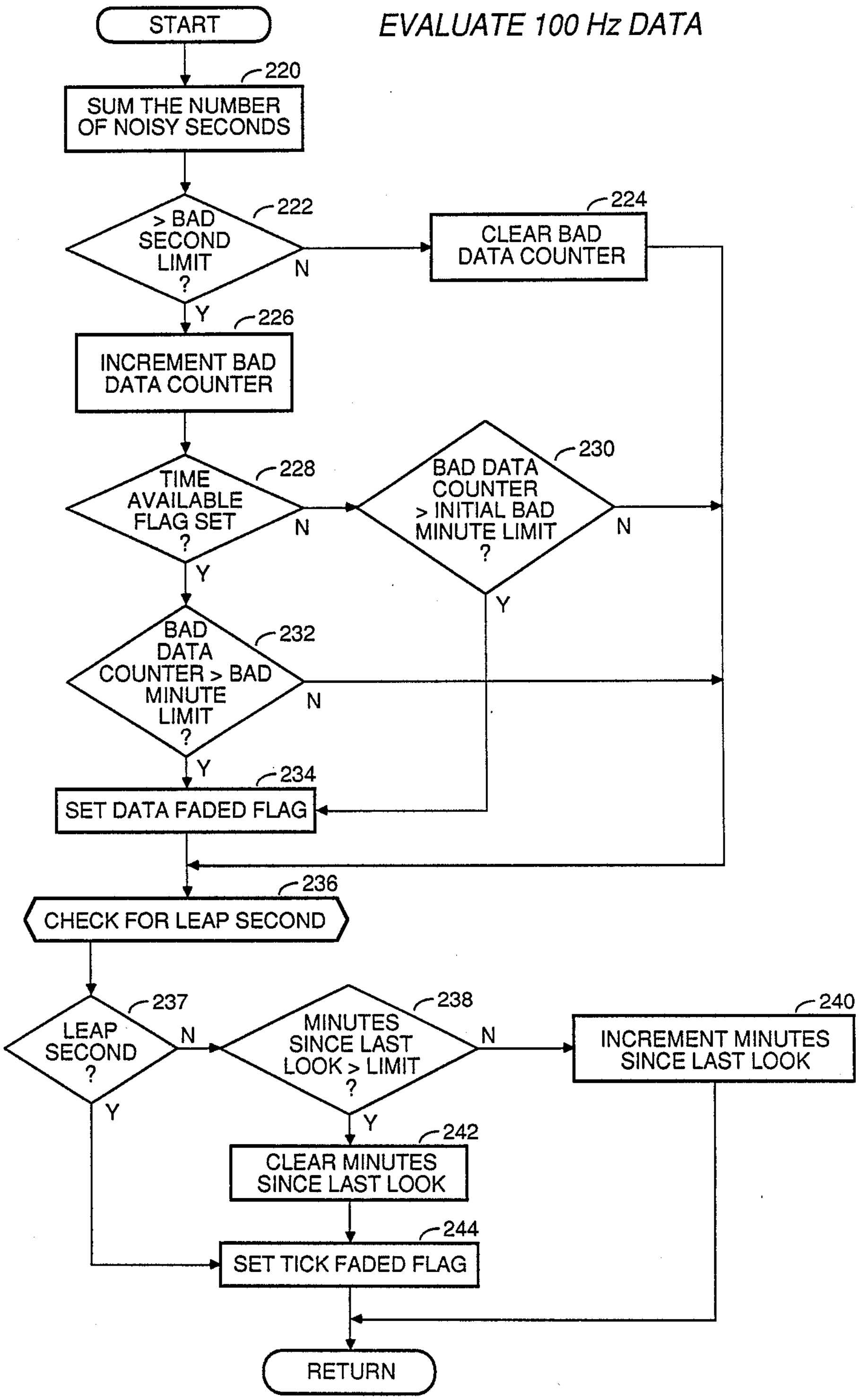
FIG. 9 is a flow chart of the steps involved in evaluation of the 100 Hz data.
Figure 10:
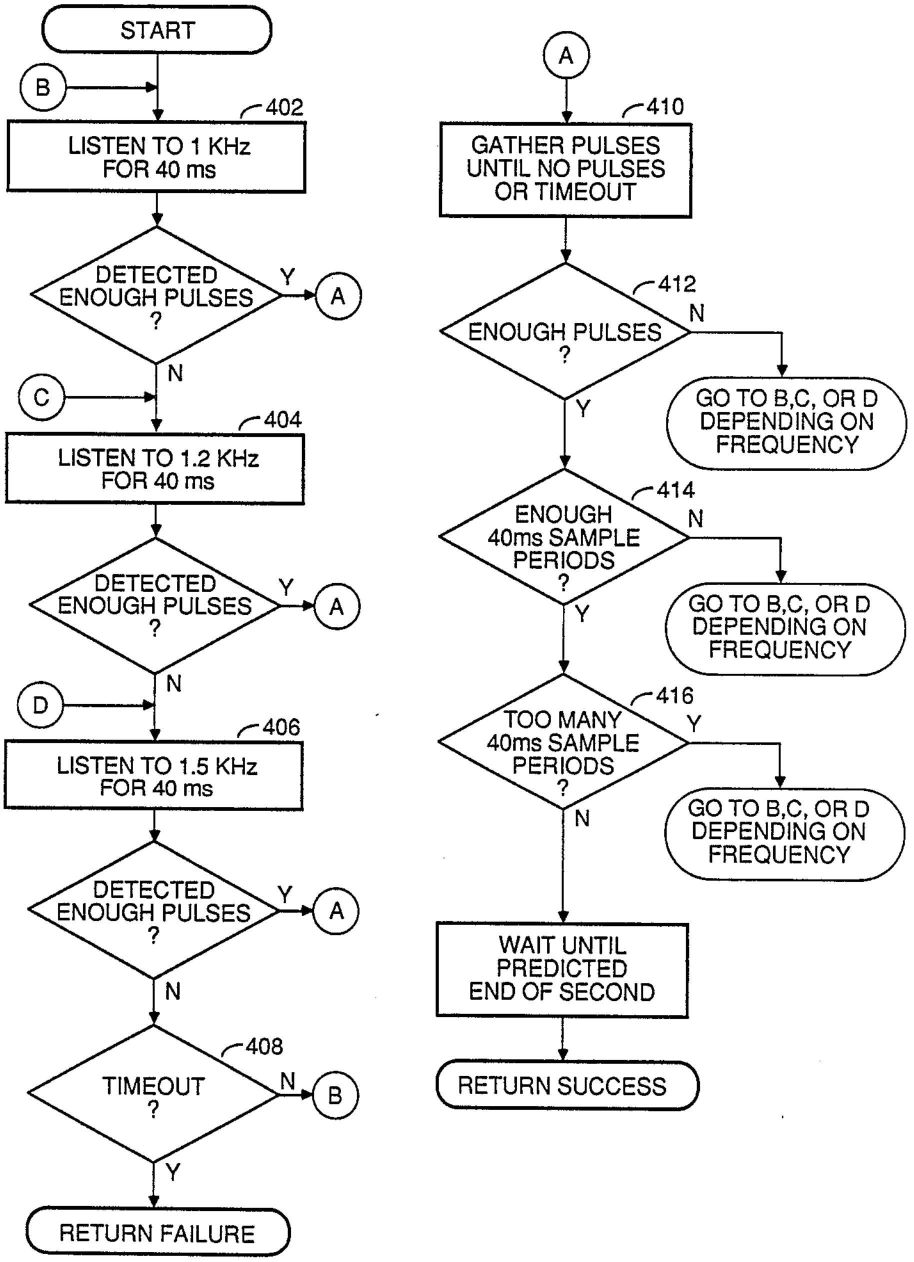
FIG. 10 is a flow chart of the steps involved in locking onto the minute marker that identifies the start of each minute in the transmitted signal.

EVALUATION OF 100 Hz DATA (FIG. 9)

The following algorithm will cause the selection of a new frequency whenever it is determined that 100 Hz data is too noisy to be decoded effectively, or that markers have shifted indicating a leap second, or when the data appears corrupted. A minute is declared noisy if more bits of the previous minute than the bad second limit (presently 15) were undecodable. The data faded flag is set (which will cause a new frequency to be selected as per 144 in the main loop) if there have been k consecutive noisy minutes, where k=initial bad minute limit (presently 2) if the clock is not locked on, and k=bad minute limit (presently 10) otherwise.

Turning to FIG. 9, at second 0 the number of noisy seconds received in the previous minute is summed. If this number is less than the number of bad seconds (block 222), then the bad data counter 224 which keeps track of the number of consecutive bad minutes is cleared 224. Otherwise the bad data counter is incremented 226 and, according as the clock is or is not locked on, the data faded flag is set 234 if the appropriate limit has been exceeded as shown in 230 and 232. This will cause the selection of a new frequency, as per the main loop.

Figure 3:
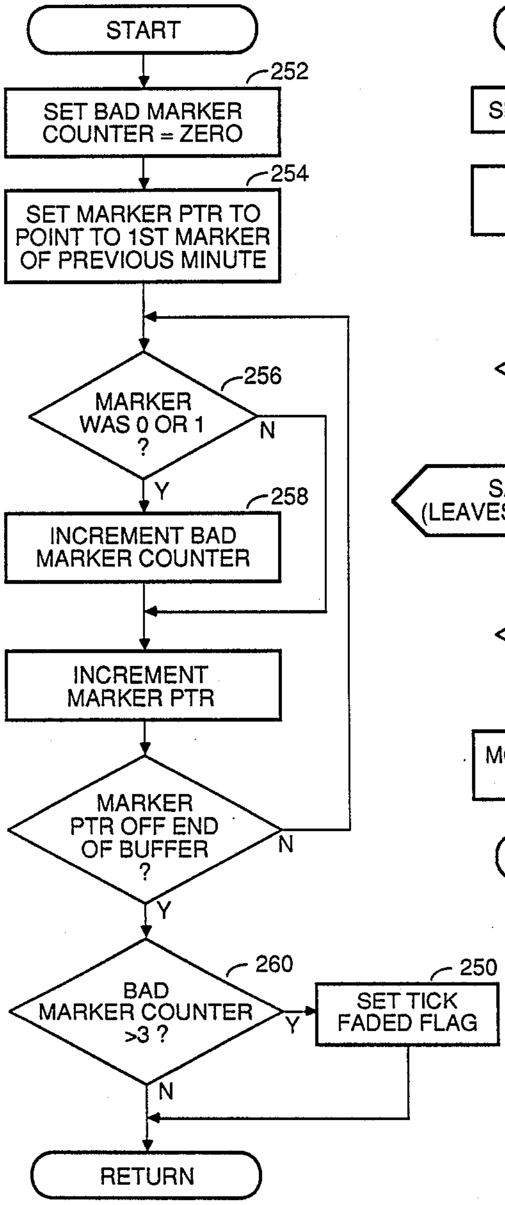
FIG. 3 is a flow chart of the leap second detection method of this invention.

The next step is to check for leap seconds, described below with reference to FIG. 3. If no leap second is detected (236, 237) the number of minutes since last lock is compared 238 to a preset limit (currently 12). If this limit is exceeded, then "minutes since last lock" is cleared, and the tick faded flag is set. Otherwise, minutes since last lock is incremented. If a leap second is detected, the tick faded flag is set.

As previously noted (236) leap seconds are occasionally added to or subtracted from the time to account for changes in rotation of the speed of the earth.

LEAP SECOND DETECTION (FIG. 3)

Since no warning that a leap second is about to occur is transmitted by WWV/WWVH, the following algorithm has been adopted to determine that a leap second was transmitted. Markers are transmitted every 10 seconds. The algorithm is based on the fact that it is exceedingly unlikely that a transmitted marker will be decoded as a 0 or 1. This fact can be used to detect shifting markers, in which case the net result at block 250 will be to set the tick data faded flag, causing selection of a new frequency. This will, in turn, cause the clock system to relock onto the time as now altered by the leap second.

The leap second detection algorithm starts by setting the bad marker counter to 0 (box 252) and then begins looking for the markers, of which there should be six in each minute (box 254). Each marker position is checked to see if in fact a marker was received; if instead 0 or 1 was received this constitutes (box 256) a non-marker, causing incrementing of the counter 258. At the completion of the loop, the total number of non-markers is compared to three (block 260); if the limit is exceeded, it is assumed that a leap second has occurred, causing choosing of a new frequency. This will result in the clock freshly locking on to all of the data. The limit of three was chosen on the basis of empirical testing.

DIGITAL CRYSTAL TRIMMING OR TICK CENTERING (FIG. 6)

This algorithm is used for two related purposes: to calibrate the hearbeat of the microprocessor to the transmitted time signal while good signal is being received, and to set up the internal microprocessor to keep time accurately (by following its own heartbeat) during intervals between good signal reception (keeping the drift within spec during those times). The basic method is to determine where one second boundaries are by looking for ticks that occur at the start of a second and adjusting the heartbeat to coincide with these one second boundaries. Note that this algorithm does not entail the collection of tick arrival times, only processing thereof.

The tick centering occurs in two phases. First, as discussed with respect to the main loop, a relatively coarse tick centering step occurs immediately after receiving the minute marker to determine the boundary time differences between the received ticks and the internal heartbeat within one to two ms. If coarse centering fails, the clock picks a new frequency (possibly the same one) and waits again for a minute marker and tries coarse centering. At the end of this minute and all subsequent minutes, a fine tick centering loop determines time and aligns the heartbeat with the received ticks to within several hundred microseconds. Both loops run in the same basic algorithm.

The method to estimate the start time of a second is: When the first pulse in a tick occurs at the edge detector, record this arrival time as the time of the second boundary. Count the total number of pulses in the tick. (Tick data is taken from 1000 or 1200 Hz based on the frequency of the last minute marker received.) There will be five (resp six) cycles received if the frequency is 1000 Hz (resp 1200 Hz). After going through the filter, there will be a few more pulses due to ringing. The data is discarded if the arrival time deviates too much from the expected time of the seconds boundary, or if the number of pulses deviates by too much from the expected number (both symptoms of noise rather than a real pulse.)

When the (up to) 12 pulse arrival times have been recorded, they are sorted in increasing order of distance from their expected arrival time. The four closest together are taken as the new estimate of where a seconds boundary is, provided they do not differ by more than a threshold. This threshold is currently 10.5 ms during the fine centering loop and 2 ms for the coarse centering loop. During coarse tick centering, the algorithm also checks to see that the maximum allowable drift has not been exceeded. The maximum allowable drift (MAD) is the limit of drift before the clock is declared out of spec.=maximum number of minutes without signal x drift per minute assuming 10 parts per million crystal drift currently, and must be constantly checked so that the clock does not become inaccurate when the guess time is being incremented solely by the heartbeat.

Fine tick centering derives both a more accurate value for the seconds boundary and a correction which is applied to the heartbeat at the beginning of each minute to trim it to the received seconds boundaries. Trimming is accomplished as follows.

The internal timing or heartbeat is derived from an interrupt which is generated about once per ms (1536 cycles of the 1,536,000 Hz clock rate of the micro). The correction is applied by altering the cycles per interrupt by ±1 as long as necessary. For example, if a 150 cycle positive correction is indicated, the interrupt will occur every 1535 cycles for the first 150 interrupts of the minute.

Let minute n be the nth minute after successful coarse tick centering. If minute n is a good minute, then let D(n) be the difference in 1.536 Mhz cycles between the beginning of minute n=1 in the internal timebase and the beginning of minute as estimated by the result of fine tick centering in minute n. This will be the correction applied at minute n+1.

Let C(K+1) be the correction to be applied if minute K is a bad minute. C(n) is computed at the end of minute n $$C(n+1)=\tfrac{7}{8}*C(n)+\tfrac{1}{8}*D(n) \text{ minute n is good:}$$

$$C(n+1)=C(n) \text{ minute n is bad.}$$

Initialize the computation by setting C(0)=0. If ticks have faded (too many bad minutes in a row), the frequency selection algorithm will be run again, followed by minute marker lockon and subsequent coarse tick centering.

Turning to the implementation of the tick centering algorithm (FIG. 6), the first step is to check to see whether the adjust flag is set 262. This indicates whether tick arrival times in the first or last 12 seconds of the minute are to be recorded. In either case, for the algorithm to execute, at least four ticks must have been accumulated in the buffer 268 or the program will branch to step A of FIG. 6. This return causes incrementing of the watchdog buffer 270 which will eventually indicate that the tick data has faded so severely that the tick faded flag must be set 276.

If at least four ticks were received, the received ticks during the last minute are sorted 270 to find the group of four ticks with the smallest delta between the first and last tick. In other words, the system incorporates means for ascertaining the delta between when a tick should arrive (according to the hearbeat) and when it actually arrived. If data is being received, there should be at least one group of four ticks which are all reasonably close to the heartbeat driven guess timebase and which deviate from that timebase in the same direction and by substantially the same amount. The calculated difference between the selected group of four ticks and their internally predicted arrival time (block 272) is then compared to the coarse centering limit (block 280), if the adjust flag was set (block 282). The adjust flag being set indicates that the system checks tick centering during the first 12 seconds of a minute and the comparison is made against a coarse limit 280. If the adjust flag is not set, the delta is compared to fine resolution limit 284; at this step, the last transmitted seconds, i.e., seconds 47–58 are examined. The adjustment calculated in 286 is as per the above description. After application of the adjustment, the tick fade watchdog counter is reset to 0, as adequate tick information and adequate signal are being received on the frequency. Whether the routine follows blocks 286 and 288 or 270–276, on reaching block 290 the calculated adjustment is applied. The internal buffer that stores the received detected tick data for the minute is reset (block 292) so that a new set of ticks can be detected and stored in the succeeding minute. By making this weighted adjustment, means are provided for always making an accurately calculated adjustment to the correction of the internal heartbeat relative to the externally received signal ticks.

The adjustment is made as follows: the oscillator normally runs at a rate which provides 1536 heartbeats for every ms of the external clock. Therefore, by changing this rate to 1535 or 1537, the internal heartbeat of the system is temporarily speeded up or slowed down to adjust the relationship between the heartbeat and the received ticks which define the boundary of each second. This modification of the heartbeat occurs for a limited time; the heartbeat then returns to the normal 1000 Hz rate. This approach constitutes a significant improvement and departure from known approaches such as a modification of the actual oscillator rate to conform to the perceived rate of the clock signal as disclosed in the '434 patent.

PICK BEST FREQUENCY (FIG. 4)

The pick best frequency algorithm is called by the main loop whenever data is not being detected with sufficient accuracy as well as at power up or reset. It comprises an algorithm to be followed, i.e. means for selecting a frequency not simply on the basis of the strongest frequency, as commonly done in the prior art, but on the basis of the first frequency to be tested that yields a sufficient probability that 100 Hz data can be adequately decoded. Detection and decoding of such data is the ultimate objective of this or any similar clock.

This algorithm comprises first setting the filter 62 to 100 Hz (block 300), so that the 100 Hz data to be tested is being selected, and then selects the frequency at the top of the list 302. After checking to see that the frequency is sampled for 100 Hz data 306. A test to determine whether the data received is good enough 308 follows this procedure:

Divide a 29.9 second interval into 70 buckets of $42\frac{6}{7}$ ms each with an associated counter initialized to 0 (boxes 312,314). Set the switched capacitor filter 60 center frequency to 100 Hz. The output of the hard limiter 64 following the filter 60 will trigger an interrupt every time the filter output waveform goes positive by a small threshold. When the interrupt occurs, increment the counter of the corresponding bucket 316. Assuming perfect signal, a bucket during 100 Hz will end up with a count of 4 or 5 and other buckets will end up with a 0 except for the two buckets on the "right" and "left" edges of the 100 Hz. Means are then provided for developing a score for the detected data 318, according to the following rules:

Look at all buckets starting from the oldest. Look for solid 100 Hz followed by solid blank which is one second long (a small number of dropouts and noise pulses are tolerated). For all such pairs, increment the score of the frequency under test by 16. For all dropouts or noise, decrement score by one and do not let it be negative. Accept the frequency if score exceeds 39 out of possible 48.

If the frequency is selected, move it to the end of the list of frequencies to be tested the next time a frequency is selected. Otherwise, go to the next frequency and go to the beginning of the above loop.

The frequency selected is moved to the end of the list 310 so that over a period of time all the frequencies will be sampled. This way, the most desirable frequency will in fact be periodically sampled in the course of the routine.

DIGIT VERIFICATION (FIG. 7A, B)

It should be noted that the known prior art that utilizes signal verification such as found in the '494 patent requires that the same data be received in two consecutive minutes, or later in three subsequent minutes. This requires receipt of perfect data for 120 seconds, a relatively improbable event in the event of a noisy signal reception, or else results in lockon to the wrong tmie due to coincident errors.

Another problem with data or digit verification is that due to noise, fading, multipath, etc., a received bit cannot always be reliably decoded, and bit errors will occasionally occur. It is vital to minimize the probability of locking onto or decoding the time erroneously. The claimed algorithm guards against this as discussed below. Making the algorithm more stringent decreases the probability of decoding a bit in error, but decreases the probability of decoding it at all. Hence, there is a tradeoff between lock-on time and the probability of locking onto the wrong time. To reduce that probability to an acceptable minimum while locking on in reasonable time, the algorithm employs several techniques:

When the algorithm examines a bit, if there is a significant uncertainty about the bit, it will not attempt to decode it.

When the algorithm examines a received BCD digit with one or more sufficiently noisy bits, it will decide that the digit is not decodable.

The algorithm treats each BCD digit separately, and can therefore accumulate digits during different minutes.

The heart of the algorithm is as follows:

Associated with each digit and with the daylight savings (DS) bit is a score indicating its consistency from minute to minute. Initially this score is 0. Whenever a digit is decoded successfully, it is recorded in the history buffer, along with the time it is received. It is checked for consistency against all other recorded instances of that digit. For each consistent instance, its score is incremented by one; for each inconsistent instance, its score is decreased by two. "Lock-on" (clock claims to know the time) occurs when every time digit (minute, hour, day of year digits) and the daylight savings bits all have a score of two. The daylight savings bit is treated as follows: let A be the number of received 1's and B be the number of 0's. Assume $A>B$ (else reverse the role of A and B). Then the score for this bit is A-2B. For example, if the minutes ones digit received at time t is four and the minutes ones digit received at time $t+7$ is one, they are consistent.

Once lock-on has occurred, the algorithm continues to run. All scores must be $\geqq 2$ in the same minute (i.e., lock on) at least one time in a 12-minute period, or the clock reselects frequency, waits for a minute marker and locks on again. During this period the microprocessor continues to display and output the previously verified time, incrementing it appropriately.

Figure 7A:
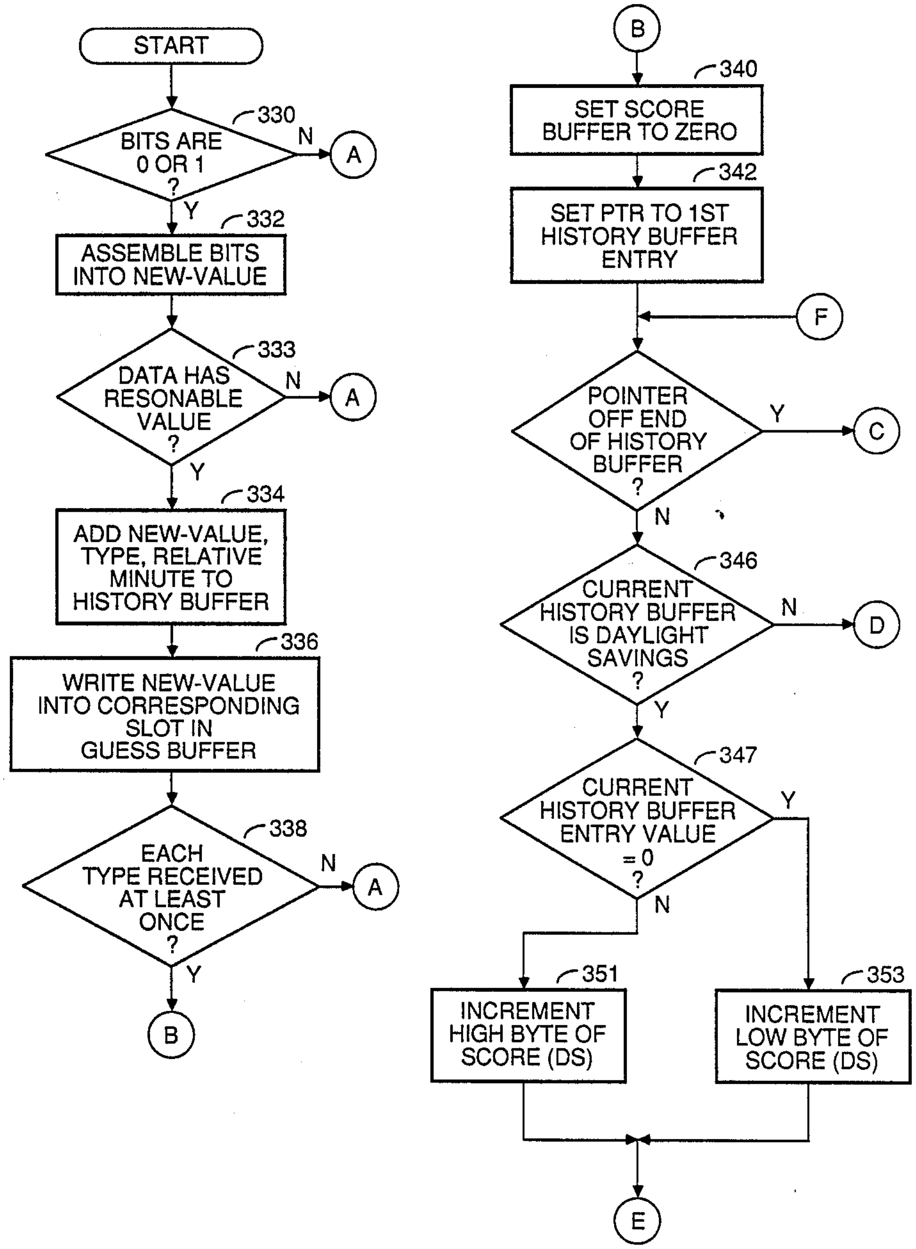
FIGS. 7A, 7B comprise a flow chart of the steps involved in digit verification prior to digit display.
Figure 7B:
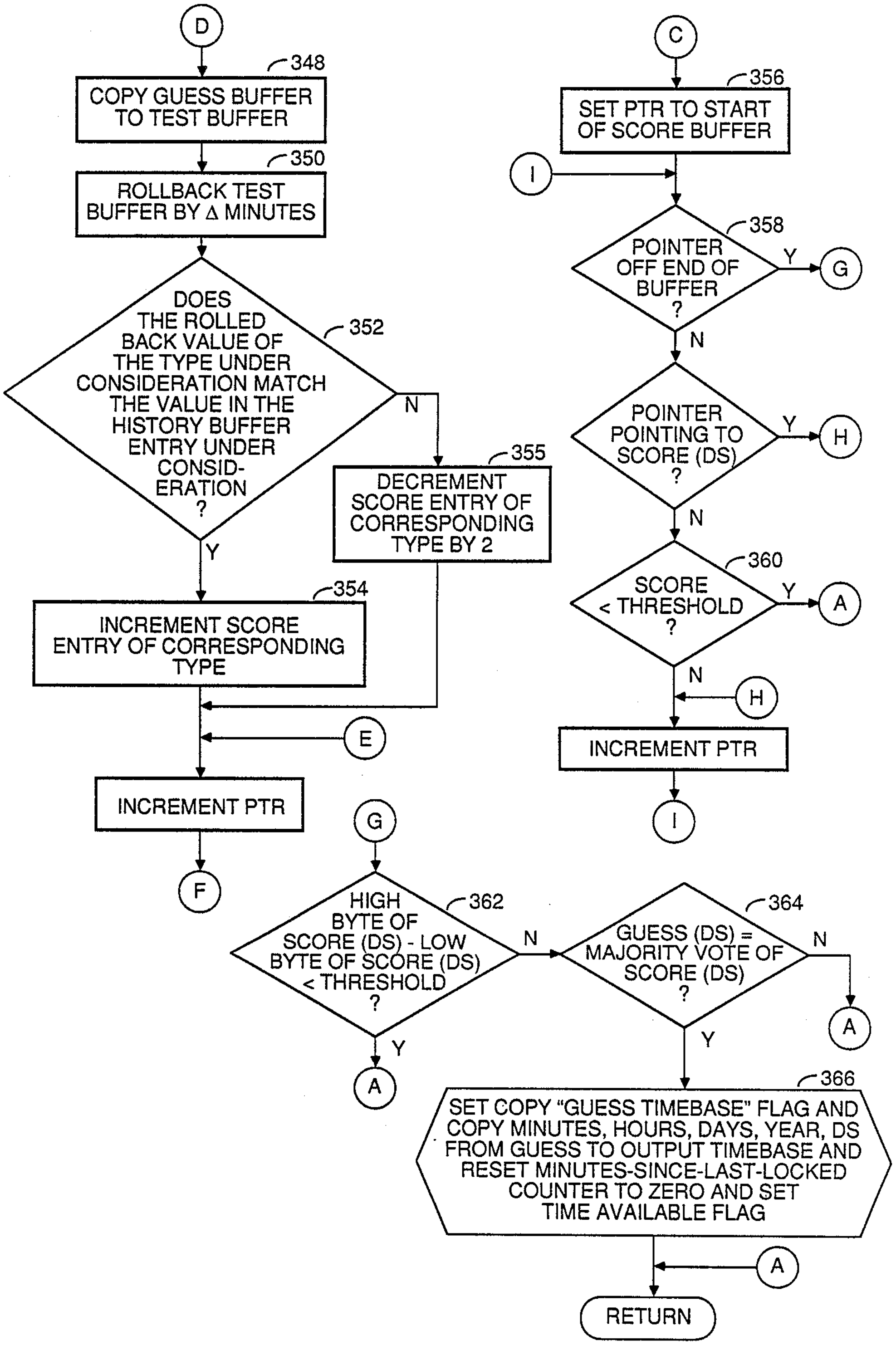

The digit verification algorithm that appears in FIGS. 7A and 7B is called when all the 100 Hz bits of a digit have been received. (The munber of bits needed to convey each digit are shown in FIG. 7C.) Thus at step 330, if other than 0's or 1's are stored, the data in the next successive digit is detected. Next, bits are assembled into values 332 that can represent actual hours, minutes, seconds, day of year or daylight savings (remembering as described in the introduction that the data is transmitted in binary coded decimal format). Each digit is then checked 333 to see if it has a reasonable value (i.e, if the hour's ten's digit is between one and two). Next, the data having a reasonable value is stored in a history buffer 334, comprising a circular buffer which records in order all of the time digits: minutes one, minutes ten, hours one, hours ten, days one, days ten, days hundred, and daylight saving. It should be noted that the history buffer is of considerable length and will contain the data received over a plurality of minutes.

For checking accuracy, the same new value just recorded in the history buffer is transferred into a corresponding slot in the guess buffer 336 replacing whatever value was previously there. The guess buffer at any time contains the most recently received data or the system's best guess at the current moment of the correct data, i.e., the "internal" time. The guess buffer is also driven by the internal heartbeat, so that once a digit is stored, it is periodically incremented until replaced by the next received corresponding digit.

On checking to see that *each* type of data, i.e, hours, minutes, etc., has been received at least once 338, the algorithm then proceeds to score the data. Scoring of the digits is accomplished by first setting the score buffer to zero 340 and looking at the first history buffer entry 342. (The daylight savings bit is separately scored 346 by constantly checking if a zero has been received 347 and modifying a score accordingly 351, 353 (FIG. 7B).) Then each entry in the history buffer is tested by copying the digits of the guess buffer into the test buffer 348, rolling the test buffer back by the number of minutes since the history buffer entry was made and comparing the rolled back value in the test buffer to the digit currently stored at that rolled-back time in the history buffer 352. Scoring is done by modifying the score for that digit 354,355 by the rule that a match adds a score of $+1$, but a mismatch adds a score of $-2$. The digit is considered verified when the digit has a score of 2. Lock-on is achieved when every digit has a score of 2. The idea behind the scoring algorithm is to define a heavier penalty for a mismatch than there is a positive score for a match, as mismatches indicate not just that no data is being received, but that bad data is being received or stored.

This routine 348–354 runs eight times a minute, testing each received digit as it is received rather than waiting for all digits to be received and stored. The set of boxes beginning at 356 labelled "set pointer to start of score buffer" is used to check that the minimum score has been achieved for all data in the history buffer 358.

The blocks 362, 364 are for checking the score of the daylight saving bit; this score is simply based on a continuing tally of the number of 0's or 1's received. If the daylight savings bit also scores as being correctly received, the time is available 366 and the guess timebase (internally maintained) is copied to the output timebase to appear on the display. A separate routine (not a part of this algorithm) modifies the output time by one hour if the presence of daylight saving time is indicated. This routine is run often until "lockon," then once a day.

HEARTBEAT INTERRUPT (FIG. 8)

Heartbeat interrupt is an interrupt enabled by the heartbeat of the system that performs internal housekeeping functions of the system which are for the most part evident from the language of the blocks. By going through the following sequence of blocks 370, 372, 374 restoration of power can be detected and recognized by the system as soon as power is restored. Since the output is interrupt drive, it may be necessary on recovery from a power failure to send out a spurious (i.e., ASCII null) character to restart the transmission.

Once power is restored, the system checks to see if any RS232 commands should be executed 378 and checks the dip switches 380. These commands can be used to either request transfer of a specific bit of data, or to reconfigure the clock, i.e., change the day, year, time zone of operation, etc. In this way, the present clock is made configurable by external commands. The dip switches 380 can override some RS-232 commands. If the timekeeping is not disabled 382, the algorithm checks the tick adjustment 384, 386. If tick adjustment is complete, the 1 Khz clock is reset to 1 Khz 388. The TTL port by which customers' specific commands are provided 390 is serviced. The reason for the presence of box 392–394 is that once digit verification is complete, a flag is set indicating this fact (read at box 392). The guess buffer which holds the verified digit, i.e., the verified internal timebase, is now copied to the output timebase 393, and the flag is reset 394.

Next the internal timebase is incremented by 1000th, 395. If this is guess thousandth is zero 396, the hundredths and tenths timebase are incremented 397 as may be appropriate. The centisecond flag is now set 398; this flag is provided because the main loop will run 100 times a second on centisecond boundaries. At the start of a second, 399 the routine will start receiving tick data. The edge detection software is initialized and edge detection hardware is enabled 401, and the output time-base is incremented 403. Finally, the daylight savings correction is computed 400, completing this routine.

LOCK ONTO MINUTE MARKER FIG. 10

The minute marker loop's function is to wait until it receives a minute marker from WWV or WWVH, and then detect it. However, the minute markers can be hard to detect. Therefore, the steps followed in this sequence are to listen to the 1 KHz (station WWV) 402 for 40 ms and if it does not receive sufficient signal to listen to 1.2 Khz (Station WWVH) 404, for 40 ms. In this way, the system will automatically detect the signal from either broadcast station. It should be noted that by checking for both stations in this manner the clock will always know which station it is currently receiving; therefore, it can adjust the internally calculated time by a known amount set up on the dip switches, or input over the RS-232 port to account for the different propagation delays in receiving a signal from the two stations.

The loop next checks for 1.5 KHz 406, because for the first minute of each hour both stations use 1500 Hz for the minute marker, instead of 1000 Hz (WWV) or 1200 Hz (WWVH). If the clock receives insufficient data, it returns to the start of the loop 408 until enough pulses are gathered to indicate the receipt of a minute marker 410. Once a signal is detected on one of the frequencies, the data is tested to see if enough pulses 412, 414 or too many pulses 416 were gathered. If the answer is no, return to the loop that listens to the frequencies again to try to detect a minute marker. If the right number of pulses were detected, return to success at the main loop.

In summary, this invention provides a highly efficient fully software driven system for detecting and locking onto a radio frequency based signal with a high probability of accurate decoding; decoding and verifying the data transmitted in that signal; and accurately displaying the results.

Modifications hereto may become apparent to a person of skill in the art who studies the above disclosure of a preferred embodiment. Therefore, the scope of this invention is to be limited only by the following claims.

What is claimed:

1. A clock responsive to broadcast time-based signals for keeping time in accordance therewith, said time-based signals including encoded timing information, said clock comprising
   receiver means for receiving said time-based signals,
   processing means coupled to said receiver means for decoding said time-based signals to derive a plurality of digits from said timing information representing actual clock time, and
   digit verification means for separately verifying correctness of each of said digits, including a plurality of separate digit status means for separately denoting for each digit whether said digit has been verified and the value of each verified digit, comparison means for separately comparing each said derived digit from said processing means with at least one corresponding previously decoded derived digit and for separately updating the corresponding digit status means, and means for generating a lockon signal when all of said digits have been verified.

2. A clock as in claim 1 wherein said signals including encoded timing information are transmitted on multiple frequencies, said receiver means including frequency selection means for selecting each of said frequencies in succession from a list of said frequencies, comparison means for comparing the data received on each of said frequencies to defined acceptance criterion corresponding to the decodability of said received data, and means responsive to said comparison means for locking said receiver means on one of said multiple frequencies.

3. A clock as in claim 1 wherein said signal includes tick signals at regular intervals aligned with the start of each second of said time-based signal, said processing means comprising means for detecting said ticks and for aligning internal timing of said clock with said ticks, so that said timing information can be maintained and updated when reception of said time-based signal is lost, as well as maintaining accurate synchronization of said internal time with said received time-based signals.

4. A clock as in claim 2 wherein said timing information signal is digitally encoded and transmitted every minute at a fixed frequency, said clock comprising means for sampling said data signal for a fixed limited number of minutes for sampling and decoding of valid timing information and for defaulting to said frequency selection means if verified data is not successfully decoded and verified within said fixed number of minutes.

5. A clock as in claim 1 wherein said signals are broadcast on multiple frequencies, said receiver means comprising a timing system for selecting one of said multiple signals for reception, IF converter means coupled to said timing system for converting the selected signal into an intermediate frequency, and an attenuator coupled to the output of the IF converter, whereby a significant reduction in the audio distortion of the signal being processed is achieved.

6. A clock as in claim 1 wherein said timing information includes a plurality of markers at predefined marker positions and a multiplicity of binary digits at other predefined positions in each minute, said clock including leap second detection means for detecting a shift in said markers indicative of a leap second occurrence in said timing information, including marker examining means for examining said time-based signals at said predefined marker positions and for detecting the number of binary digits at said predefined marker positions within a minute, means for comparing said detected number of binary digits at said predefined marker positions within a minute to a preset limit, and means for initiating an adjustment of said clock if said detected number of binary digits at said predefined marker positions exceeds said preset limit.

7. A clock as in claim 1 wherein said timing information includes minute marker signals and tick signals defining the start of each second of said minute, said clock including means for digitally generating an internal clock, and means for synchronizing seconds of said internal clock with said tick signals, said means for synchronizing including means for calculating a difference between the position of said tick signals relative to the seconds of said internal clock, and means for calculating an adjustment for said internal clock based on said calculated difference and a previous calculated adjustment of said internal clock.

8. A clock as in claim 1 wherein said data is transmitted by pulse width modulation, said clock including means for testing the existence of decodable data at a selected signal frequency comprising means in said receiver means for receiving said selected signal frequency;

means for dividing time intervals during which data may exist into a sequence of buckets, means for incrementing a score for each bucket in response to reception of zero crossings of a pulse width modulated signal, and threshold means for comparing the accumulated score for said buckets with criteria for decodable pulses to determine that said selected signal frequency is conveying decodable data.

9. A clock as in claim 7 wherein said synchronizing means comprise means for calculating a weighted correction factor based on assigning a greater weight to said previous calculated adjustment and a lesser weight to said calculated difference.

10. A clock as in claim 2 wherein said frequencies are transmitted from first and second stations at separate geographical locations, said first and second stations' signals being characterized by separate identifying signals, said clock including means for sampling said signals to distinguish said signals from said separate geographical locations, and means for altering the internal time of said clock to adjust for differing propagation delay times from said first and second stations.

11. A clock as in claim 1 wherein said verification means comprise a history buffer for storing each said digit as it is received and decoded, said history buffer being of sufficient length to store a plurality of each of said time digits as received over a plurality of minutes, a guess buffer storing the most recently received of each of said time digits, and means for comparing each of said guess buffer time digits to a corresponding digit value stored in said history buffer.

12. A clock responsive to broadcast time-based signals for keeping time in accordance therewith, said time-based signals including encoded timing information, said clock comprising receiver means for receiving said time-based signals, processing means coupled to said receiver means for decoding said time-based signals to derive a plurality of digits from said timing information representing actual clock time, digit verification means for separately verifying correctness of each of said digits, display means for displaying said digits, and means responsive to said digit verification means for causing any unverified digit to blink at regular intervals on said display means until all of said digits are verified.

13. A clock as in claim 12 wherein said processing means include means for maintaining an internal, guess timebase and a second output timebase, means for coupling said output timebase to said display means, said digit verification means operating on said guess timebase, and transferring said guess timebase to replace said output timebase on verifying said digits.

14. A clock responsive to broadcast time-based signals for keeping time in accordance therewith, said time-based signals including encoded timing information, said clock comprising receiver means for receiving said time-based signals, processing means coupled to said receiver means for decoding said time-based signals to derive a plurality of digits from said timing information representing actual clock time, digit verification means for separately verifying correctness of each of said digits, including history buffer for storing each said decoded digit, said history buffer being of sufficient length to store a plurality of each of said digits as received over a plurality of minutes, a guess buffer storing the most recently received of said decoded digits, and comparison means for comparing each of said digits stored in said guess buffer with corresponding digit values in said history buffer, and internal clock means for automatically incrementing at least one of said digits stored in said guess buffer when the corresponding digit is not successfully decoded by said processing means, whereby the internal time is maintained when signal is lost.

15. A method of synchronizing a clock to broadcast time-based signals, said time-based signals including encoded timing information, said method comprising the steps of receiving said time-based signals, decoding said time-based signals to derive a plurality of digits from said timing information representing actual clock time, and separately verifying the correctness of each of said digits, said correctness verifying step including the steps of separately comparing each said derived digit with at least one corresponding previously decoded derived digit and verifying said derived digit when it meets a predefined verification test based on the consistency of said derived digit with said at least once corresponding previously decoded derived digit, repeating said comparison and verifying steps as said time-based signals are decoded until each said derived digit has been separately verified, and generating a lockon signal when all of said derived digits have been verified.

16. A method of synchronizing a clock as in claim 15, wherein said time-based signals including encoded timing information are transmitted on multiple signal frequencies, said receiving step including the steps of selecting each of said frequencies in succession from a list of said frequencies, comparing the data received on each of said signal frequencies to defined acceptance criterion corresponding to the decodability of said received data, and locking onto a selected signal frequency when the data received on said selected frequency meets said defined acceptance criterion.

17. A method of synchronizing a clock as in claim 16, wherein said encoded timing information in said time-based signals is transmitted by pulse width modulation, said decoding step including testing for the existence of decodable data at a selected signal frequency by performing the steps of dividing time intervals during which encoded timing information may exist into a sequence of buckets, incrementing the score for each bucket in response to reception of zero crossings of a pulse width modulated signal, and comparing the accumulated scores for said buckets with criteria for decodable pulses to determine whether said selected signal frequency is conveying decodable data.

18. A method of synchronizing a clock to broadcast time-based signals, said time-based signals including encoded timing information, said method comprising the steps of receiving said time-based signals, decoding said time-based signals to derive a plurality of digits from said timing information representing actual clock time, storing each decoded digit in a history buffer of sufficient length to store a plurality of each of said digits as received over a plurality of minutes, storing a guess value for each of said plurality of digits in a guess buffer, comparing each said guess value in said guess buffer with the corresponding decoded digits stored in said history buffer; and separately denoting each said guess value as a verified time value when said comparing step indicates that the number of said corresponding decoded digits which are consistent with said guess value exceeds by a predefined margin the number of said corresponding stored decoded digits in said history buffer that are inconsistent with said guess value.

19. A method of synchronizing a clock as in claim 18, including the step of automatically incrementing at least one of said guess values stored in said guess buffer when the corresponding digit is not successfully decoded by said decoding step, whereby an internal time value is maintained when signal is lost.

20. A method of synchronizing a clock as in claim 18, wherein said timing information includes a plurality of markers at predefined marker positions and a multiplicity of binary digits at other predefined positions in each minute, said method including detecting a shift in said markers indicative of a leap second occurrence in said timing information by performing the steps of examining said time-based signals at positions where markers are expected, detecting the number of binary digits at said predefined marker positions within a minute, comparing said detected number of binary digits at said predefined marker positions within a minute to a preset limit, and initiating an adjustment of said clock if said detected number of binary digits at said predefined marker positions exceeds said preset limit.

21. A method of synchronizing a clock as in claim 18, wherein said timing information includes tick signals defining the start of each second of said minute, said method including the steps of generating an internal digital clock signal, and synchronizing seconds of said internal clock signal with said tick signals, said step of synchronizing seconds of said internal digital clock signal including the steps of calculating a difference between the position of said tick signals relative to the seconds of said internal digital clock, and calculating an adjustment for said internal digital clock based on said calculated difference and a previous calculated adjustment of said internal digital clock.

22. A method of synchronizing a clock as in claim 21, said step of calculating an adjustment including the step of calculating a weighted correction factor based on assigning a greater weight to said previous calculated adjustment and a lesser weight to said calculated difference.

23. A method of synchronizing a clock as in claim 18, wherein said encoded timing information in said time-based signals is transmitted by pulse width modulation and said time-based signals are transmitted on multiple signal frequencies, said decoding step including testing for the existence of decodable data at a selected signal frequency by performing the steps of dividing time intervals during which encoded timing information may exist into a sequence of buckets, incrementing the score for each bucket in response to reception of zero crossings of a pulse width modulated signal, and comparing the accumulated scores for said buckets with criteria corresponding to the existence of decodable pulses to determine whether said selected signal frequency is conveying decodable data.

* * * * *